UNITED STATES PATENT OFFICE.

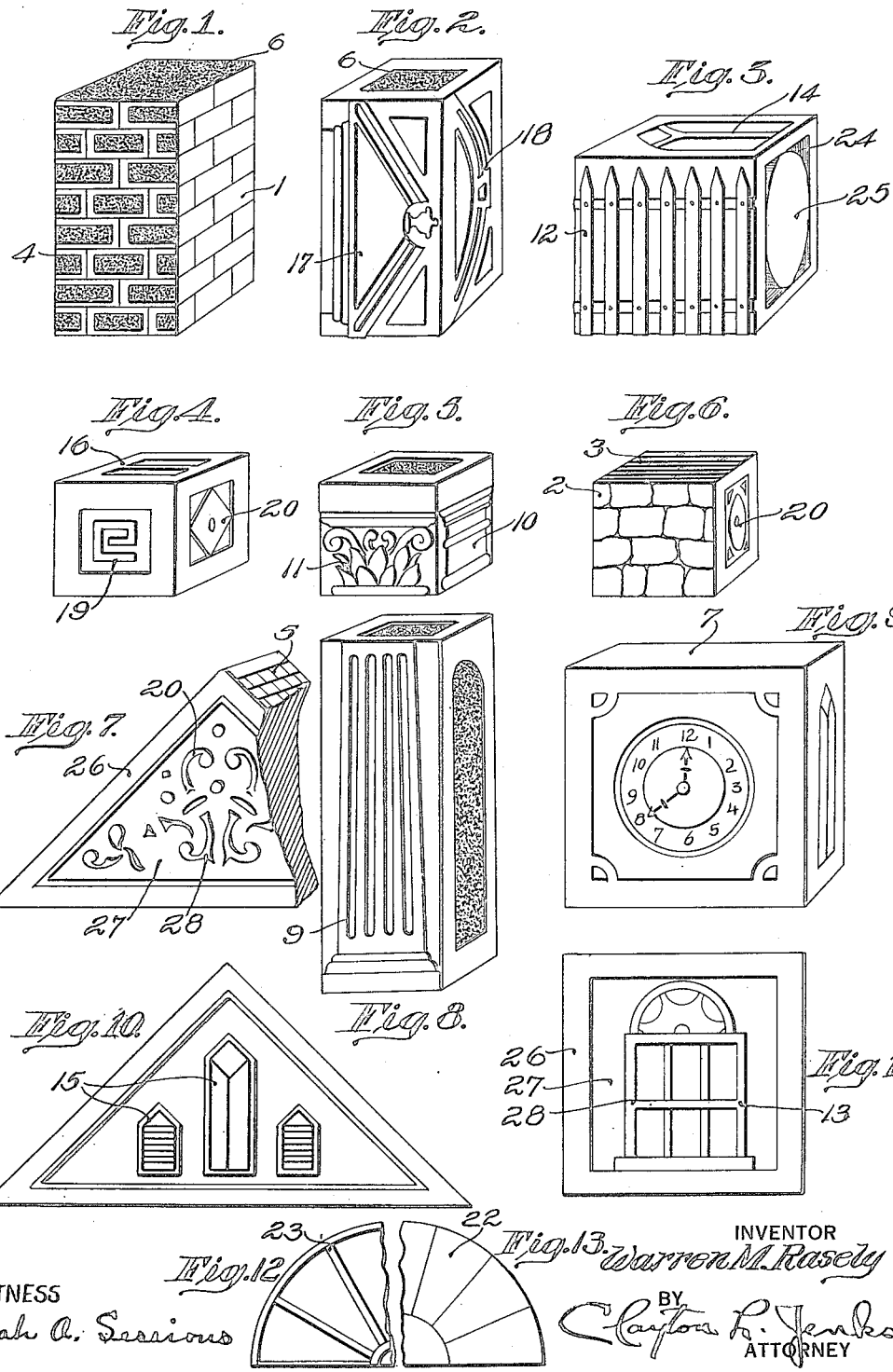

WARREN M. RASELY, OF WORCESTER, MASSACHUSETTS.

EDUCATIONAL TOY BLOCKS.

1,403,196. Specification of Letters Patent. Patented Jan. 10, 1922.

Application filed March 10, 1919. Serial No. 281,829.

*To all whom it may concern:*

Be it known that I, WARREN M. RASELY, a citizen of the United States of America, residing at Worcester, in the county of Worcester and State of Massachusetts, have invented certain new and useful Improvements in Educational Toy Blocks, of which the following is a full, clear, and exact specification.

My invention relates to educational toys and more particularly to sets of building blocks adapted to be piled up in various architectural designs. Building blocks for children as heretofore put on the market have been simple geometrical shapes without any special design except possibly such as would have no particular significance to an architect or builder. Such blocks have ordinarily had plain faces or they have been decorated with fragments of pictures for use as puzzle blocks which, while highly colored and possibly pleasing to the child's eye, do not instruct him in things worth while.

It is an object of my invention to make building blocks for children instructive as well as amusing and to provide a set of block units of regular geometrical design which may furnish representations of the well known forms of architecture and of building materials and suggest portions of buildings, or imitations of objects of interest or types of surroundings which make up the environment of the average building, whereby a child may pile up the blocks in simple geometrical patterns and yet produce elaborate and involved designs which portray diversified types of architecture. Other objects will be apparent from the following disclosure.

Referring to the drawings, I have there illustrated various forms which my block units may have in accordance with my invention:

Figures 1 to 9 being perspective views of toy blocks showing different architectural and mechanical representations of building designs, materials and associated objects;

Figs. 10 and 11 being elevations of the reverse sides of the blocks shown in Figs. 7 and 9 respectively; and Figs. 12 and 13 being partial elevations of opposite sides of a semi-cylindrical block showing different construction designs thereon.

In accordance with my invention, I provide toy blocks of various shapes, such as cubes, cylinders, etc., which have substantially plane faces for piling one on another and I fashion these blocks or decorate them to represent or portray, preferably on regular geometrical faces, various types of architectural designs and materials which are ordinarily used in building operations. These blocks may be made of various materials, such as wood, clay, artificial stone, etc., and they may be decorated in various ways. I however prefer to make them from plastic material which may be formed and set in shapes adapted to represent desired architectural features, as by relief or intaglio designs.

In order that a child may become acquainted with different building materials, I provide blocks which represent in relief design on their otherwise plane faces well known construction elements such as bricks 1 (Fig. 1), stone 2 (Fig. 6), wooden clapboards 3, cement blocks 4, shingles 5 (Fig. 7), stucco or cement work 6, etc., which are shown assembled or built into architectural construction units.

Since one would wish to use substantially all of the blocks in building with each type of architectural material chosen for a given design, I preferably have different faces on the same block represent or suggest different building materials. I may leave one face 7 (Fig. 9) of many blocks blank in order that the child may choose its own design and be unhindered by those shown on other faces of the blocks.

Furthermore, the child should be instructed in the different well known types of architecture, such as the Greek, Roman, Gothic, Renaissance, Byzantine and the modern constructions, and I therefore so form certain blocks in the toy set that each may represent at least one well known type of architecture, and I preferably provide various forms and types of architecture on each block. For example, the various Grecian columns may be built up of two blocks, one representing on its sides different types of columns, as shown, i. e., by the fluted column 9 (Fig. 8) while a second block of suitable proportions (Fig. 5) shows the Doric 10, the Corinthian 11 and other types of cap stone adapted to be used with the various columns. If desired, a separate base block may be provided to make the toy set more complete and realistic. By means of these blocks a child may build up many of the well known types of column design.

In order that the blocks may be used for other purposes besides illustrating architectural designs and materials, I show on some of the faces of my set of blocks representations of other objects or units used in building and construction work such as fences 12, French windows 13 (Fig. 11), Gothic windows 14 (Fig. 3), a set of windows 15 (Fig. 10) or a half of a door 16. Similarly the blocks may illustrate special ornamentations such as tops of doorways 17 (Fig. 2) or an arch and keystone 18, or they may show special designs 19 (Fig. 4) for frieze ornamentations or other decorations 20 (Figs. 4, 6 and 7).

I furthermore utilize special pieces to show mechanical as well as architectural constructions. For example, two hemi-cylinders (Figs. 12 and 13) may be decorated on one side to represent a window design or archway 22 and such, and on the other may be a diagrammatic representation which impressionistically suggests the spokes of a railway locomotive wheel 23 or a steamboat paddle wheel, etc. Such a cylindrical part or disk may have its peripheral portion decorated to represent architectural designs used wherever a cylindrical part is useful, such as in a column or fence-post.

Blocks may be hollow as shown at 24 in Fig. 3 and other blocks 25 adapted to fit within the same. While the shapes of these blocks may be widely varied, it is to be noted that they are designed for piling one atop of another, hence all or part of the faces on each block are substantially plane faced. Blocks having relief representations of designs of building materials, such as shown in Fig. 1, are so formed that the outer parts of a sufficient portion of the relief are in substantially the same plane and capable of permitting the blocks to be piled one on another. Other blocks have architectural designs represented in relief thereon. In order that these may be piled up, I provide each block with an extensive plane surface area 26 which, as shown in Fig. 4, is as high as the relief and so forms a depressed or countersunk portion 27 adjacent the relief portion representing the particular design to be portrayed. The plane area 26 shown in Figs. 7 and 11 forms a peripheral band around the depressed part 27 and the raised design 28 which provides a level base for making a stable pile of blocks. Various other methods of marking the blocks or showing the effects intended may obviously be used within the scope of my invention.

By means of this set a child may pile up various cubically shaped blocks as his desire dictates and form one of many obtainable architectural designs which suggest buildings of well known types and materials. These blocks are not piled or arranged to make up a given effect without reference to their face designs but they are preferably used according to regular geometrical patterns. For example, a long picket fence may be easily represented by a single row of contiguous blocks whose front faces show fence units. It is further to be noted that these units are so made as to fit one to another without break in the design, so that half a fence post and half a picket, for example, will not be placed next one another. Each unit is complete in itself and is exchangeable for other like units or may be replaced by other blocks carrying entirely different designs. These designs are so arranged and proportioned relative to the block faces that one does not particularly notice that they are all shown on square faces or similar simple geometrical figures. In fact, this arrangement and interchangeability of units is what makes the blocks most usable. By substituting a square faced block showing a Gothic window for one representing a modern door, the whole toy building is changed.

Various ways of using this set and numerous modifications of the designs not herein described will be readily suggested to one who has read this disclosure as being within the scope of my invention and the claim is to be interpreted as covering modifications and equivalent constructions.

Having thus described my invention, what I claim as new and desire to secure by Letters Patent is:

An educational toy comprising a set of building blocks of regular geometrical shapes each of certain blocks having colored relief representations of different structural building materials on different faces thereof, said faces being adapted for piling one block on another, and other blocks having architectural and structural designs in colored relief on certain faces, which are typical of different periods and of types of fabricated objects, the faces bearing these relief designs having extensive plane surface areas located adjacent and as high as the relief portions to form level bases for piling the blocks, and one side of a block being adapted to be used with a plurality of other block sides, whereby miniature houses may be built of the same blocks to suggest diversified styles of architecture modeled in materials of construction applicable thereto.

Signed at Worcester, Massachusetts, this 8th day of March, 1919.

WARREN M. RASELY.